United States Patent
Chang et al.

(10) Patent No.: US 7,139,918 B2
(45) Date of Patent: Nov. 21, 2006

(54) MULTIPLE SECURE SOCKET LAYER KEYFILES FOR CLIENT LOGIN SUPPORT

(75) Inventors: David Yu Chang, Austin, TX (US); Robert Howard High, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 10/062,348

(22) Filed: Jan. 31, 2002

(65) Prior Publication Data
US 2003/0145237 A1 Jul. 31, 2003

(51) Int. Cl.
G06F 11/30 (2006.01)
G06F 12/14 (2006.01)
G06F 7/04 (2006.01)
H04K 1/00 (2006.01)
H04L 9/00 (2006.01)

(52) U.S. Cl. .................. 713/193; 380/277; 726/10; 713/182

(58) Field of Classification Search ............. 713/201, 713/193, 182
See application file for complete search history.

(56) References Cited

U.S. PATENT DOCUMENTS 6,154,840 A    11/2000  Pebley et al.
6,378,071 B1 *  4/2002  Sasaki et al. ............... 713/165
2002/0095568 A1 *  7/2002  Norris et al. ............... 713/151
2002/0104025 A1 *  8/2002  Wrench, Jr. ................ 713/202

OTHER PUBLICATIONS

Applied Cryptography Second Edition, Bruce Schneier, 1996, p. 574.*

* cited by examiner

*Primary Examiner*—Kambiz Zand
*Assistant Examiner*—Christopher J. Brown
(74) *Attorney, Agent, or Firm*—David A. Mims, Jr.; Dillon & Yudell LLP

(57) ABSTRACT

A method and system to allow multiple users of a client computer to establish a secure connection for each of the multiple users between the client computer and a server computer. Each user is allowed to unlock a keyfile unique to that user. The unique keyfile is able to authenticate the user's identity to the server computer. Access to the users unique keyfile is accomplished by the user inputting into the client computer a unique user password for the user's unique keyfile. A Graphical User Interface (GUI) is provided to allow the user to input the unique user password for that user's unique keyfile. Upon input of the password, the selected keyfile is opened to enable a user authentication process to authenticate the user's identity to the server computer, thus creating an authenticated secure connection between the server computer and the client computer for the specific user.

12 Claims, 8 Drawing Sheets

MULTIPLE SECURE SOCKET LAYER KEYFILES FOR CLIENT LOGIN SUPPORT

BACKGROUND OF THE INVENTION

1. Technical Field

The present invention relates in general to the field of computers, and, in particular, to establishing a secure connection between a client computer and a server computer. Still more particularly, the present invention relates to an improved method and system for allowing each of multiple users of a single client computer to establish a Secure Sockets Layer (SSL) secure connection, which is unique for each user, between the client computer and the server computer.

2. Description of the Related Art

Personal computers and computer networks, including the Internet, are often designed to be open and flexible for ease of access to users. However, this openness presents security problems when confidential communications between computers are desired, such as when transmitting messages containing financial information, business secrets, personal information, etc. To provide security between two computers in such a network, secure connections are established between the computers to ensure that no other computer can "listen in" on the communication. To establish such a secure connection between computers with browsers and servers over insecure links that make up the Internet, the Secure Sockets Layer (SSL) system was developed.

SSL is a network protocol that provides data privacy for the bulk of the browser-to-Web server electronic business (e-business) applications on the Internet. Besides being able to establish secure connections between servers and computers with browsers, SSL also provides a protocol for encrypting messages and detecting message tampering, so users on both sides of the connection know if anything was changed in transit. To establish the secure browser (client) to server connection, SSL utilizes encryption, the process of translating data in a secret code.

As a general process, encryption typically is performed using a key, which is a set of characters (password) having a predetermined value. The key is applied in an algorithm to a string or block of unencrypted data to produce encrypted data, or to decrypt encrypted data. Encryption that uses the same key to encrypt and decrypt the data is known as symmetric-key cryptography. Symmetric-key cryptography systems are simple and fast, but their main drawback is that the two parties (one encrypting the data and the other decrypting the encrypted data) must somehow exchange the key in a secure way.

Another type of encryption, known as asymmetric encryption, avoids this problem by using two keys: a public key and a private key. The public key is available to any sender to encrypt data to be sent to a receiver. The private key is available only to the receiver to decrypt the encrypted data. Alternatively, the private key may be used to encrypt the data and the public key is used to decrypt the encrypted data. A popular algorithm used to create public and private keys is RSA, named in 1977 for its inventors Ron Rivets, Adi Shamir and Leonard Adleman. RSA uses two random large prime numbers that are multiplied together and manipulated with modulus arithmetic to create a private key that can decrypt any message that has been encrypted with the public key. Other popular cryptographic algorithms (cipher suites) include those based on a Secure Hash Algorithm (SHA), an Advanced Encryption Standard (AES) used by U.S. Government organizations, a Data Encryption Standard (DES) and Hashing Message Authenticating Code (HMAC).

A popular method using asymmetric encryption is known as a Public Key Infrastructure (PKI). PKI uses a certificate authority (CA) that issues and verifies digital certificates, which include public keys available to any party and private keys sent only to the party that requested the digital certificate.

While very secure, asymmetric encryption is slow and requires much computer processing time. Therefore, a popular blend of the two encryption technologies involves encrypting a symmetric key (for both encoding and decoding messages) and sending the encrypted symmetric key to a receiving computer, which then decrypts the symmetric key so that both the sender and receiver have a clear copy of the symmetric key. This use of both symmetric and asymmetric keys is a key feature of how SSL establishes secure links between computers.

To establish a secure connection between two computers (a client computer and a server), SSL utilizes encryption in its protocol for authenticating the identity of the two computers. The client computer and server exchange their digital certificates and confirm their authenticity by using keys in the digital certificates to encrypt/decrypt special identity confirmation messages. After authenticating the identity of each other to establish a secure connection, the client computer and the server are then able to share a private key, which can then be used to securely transmit messages between the computers. The digital certificate for the client computer is stored in the client computer's memory in a database called a keyfile, which must be accessed to establish a secure link between the client computer and the server.

In the prior art, as depicted in FIG. 1, a client 10 makes its keyfile 12 automatically accessible to establish a secure connection 20 through the use of a property file 16. Client 10 is a computer, which in the prior art is used by only a single user.

Property file 16 is a database that includes a password 18 that opens keyfile 12, making keyfile 12 accessible to server 14 to authenticate client 10's identity to establish secure connection 20 with server 14. However, in the prior art, only one keyfile 12 is associated with client 10 in the SSL scheme. Thus, if there are multiple users of client 10, each such user cannot establish an SSL secure connection 20 with server 14. While the multiple users are generally considered to be separate individual persons, they may alternatively represent multiple threads in a computing process.

SUMMARY OF THE INVENTION

The present invention therefore recognizes the need for a method and system to allow multiple users of a client computer to establish a secure connection for each of the multiple users between the client computer and a server computer. The present invention allows each user to unlock a keyfile unique for that user. The unique keyfile is able to authenticate the user's identity to the server computer. Preferably, this access is afforded by the user inputting into the client computer a unique user password for the user's unique keyfile. A Graphical User Interface (GUI) is provided to allow the user to input the unique user password for that user's unique keyfile. Upon input of the password, the selected keyfile is opened to enable a user authentication process to authenticate the user's identity to the server computer, thus creating an authenticated secure connection between the server computer and the client computer for the specific user.

The above, as well as additional objectives, features, and advantages of the present invention will become apparent in the following detailed written description.

BRIEF DESCRIPTION OF THE DRAWINGS

The novel features of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
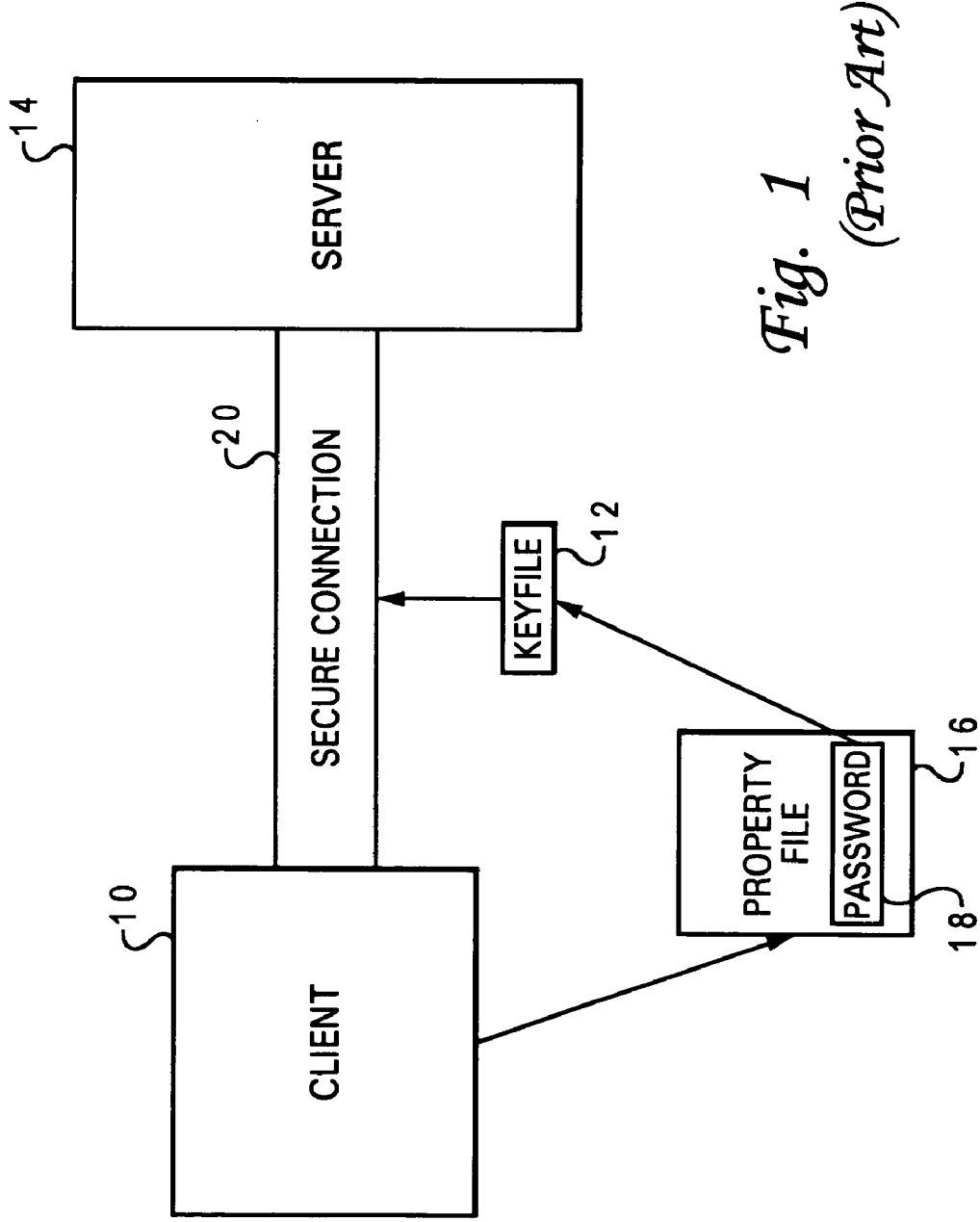
FIG. 1 is a block diagram of prior art showing a secure connection between a client and a server using a keyfile that is opened by a password stored in the client's property file.

Secure Sockets Layer (SSL) is a network protocol that provides data privacy for the bulk of browser-to-Web server electronic business (e-business) applications on the Internet. SSL was developed to provide secure data transmission to and from browsers and servers over the insecure links that make up the Internet. Besides being able to encrypt all data transmitted via SSL so that casual observers cannot read the information, SSL can also detect tampering with the data, so users on both sides of the connection know if anything was changed in transit. While other security protocols such as Secure Hypertext Transfer Protocol (S-HTTP) are designed to send individual messages securely, SSL is designed to establish a secure connection between two computers. The present invention slightly modifies this protocol by establishing a secure connection between a first computer (a server computer) and a second computer (a client computer), where the secure connection is unique for a specific user of the client computer.

Authenticating the identity of the client computer to the server computer using SSL is a multi-step process. First, the client computer ("client") initiates a connection with the server computer ("server"), telling the server which SSL cipher suite the client supports. The server then responds with the cipher suites that the server supports, and also sends the client a digital certificate that verifies the server's identity. The digital certificate, issued by a Certificate Authority (CA), contains the server's public key and a variety of other identification information for the server. Next, the server initiates a key exchange algorithm, based in part on the server's digital certificate, and sends the necessary key exchange information to the client. The client checks the client's memory to see if the client memory has in its trusted certificate database a certificate that matches the issuer of the server's digital certificate. The client then completes the key exchange algorithm and sends the necessary key exchange information to the server. Based on the type of key exchange algorithm, the client selects an appropriate cipher suite and tells the server which suite it wants to use. The server then makes a final decision as to which cipher suite to use. The client and server now have a secure connection in which to share and/or create a symmetric key, as the server has authenticated the server's identity to the client. However, the server may also wish to authenticate the identity of the client through client authentication.

Client authentication may be performed using the same procedure for server authentication as described above. In brief, the client sends the client's own digital certificate to the server, which then authenticates the client's digital certificate, typically as described above. Alternatively, the client can authenticate the client's identity with a digital signature.

A digital signature is an electronic signature that hashes (encrypts into a fixed length summary code) an original message into a hashed message (i.e., a summary) using a hash function (i.e., a hashing algorithm). The hash function and the original message, which may be a sender's name, are transmitted in the clear from a sender (e.g., a client computer) to a receiver (e.g., a server computer), along with an encrypted version of the hashed message. The encryption of the hashed message is performed by the sender using a private key, which is typically supplied by the sender's CA. The receiver then hashes the clear message using the hash function received from the sender, decrypts the hashed message using the sender's public key, and compares the two hashed messages (the one that the receiver hashed and the one the receiver decrypted). If the two hashed messages are the same, the receiver (server) can trust the sender (client), since only the sender would know the private key paired with the public key used by the sender to decrypt the hashed message.

Thus, the sender (client) must have a database, called a "keyfile," that contains the sender's private key (to encrypt the hashed message) and the sender's public key (to transmit to the receiver (server) for decrypting the hashed message) for client certification using hashing. Further, the sender (client) needs a keyfile (typically the same keyfile that contains the sender's private and public keys) containing the name of the sender's CA to give to the server for client authentication using the first process described above.

Figure 2:
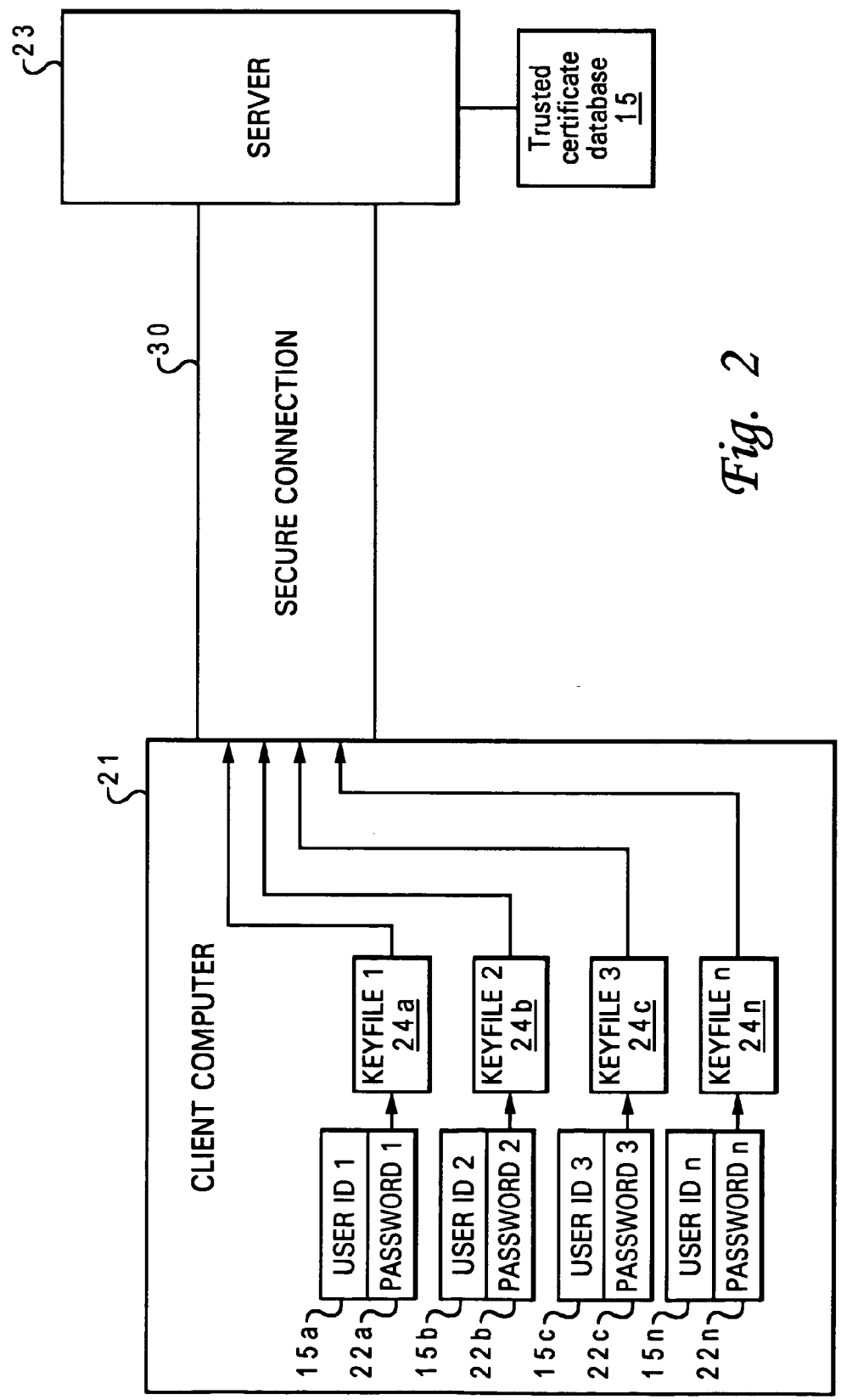
FIG. 2 is a block diagram of a client computer having multiple users, each of whom are capable of establishing a secure connection with the server by directly accessing their respective keyfiles.

For a single client computer to support multiple users each capable of authenticating their identity to a server computer, multiple keyfiles for each user are needed. With reference now to FIG. 2, there is depicted a block diagram of a network having a client computer 21 capable of supporting such multiple users. Client computer 21 contains a means for receiving an input of a password 22 to open a keyfile 24 associated with each user identified by that user's user identifier 15. For example, a user identified by user identifier 15*a* ("User ID 1") enters password 22*a* ("Password1") to open keyfile 24*a* ("Keyfile 1"). Data in keyfile 24*a* is then used to authenticate that user as described below, thus completing a secure connection 30 with server 231 such that there is authentication of the user who is using client computer 21 with server 23. To perform this authentication in one scheme, server 23 compares the user's digital certificate with those stored in server 23's trusted certificate database 15, describe in further detail below.

Figure 3:
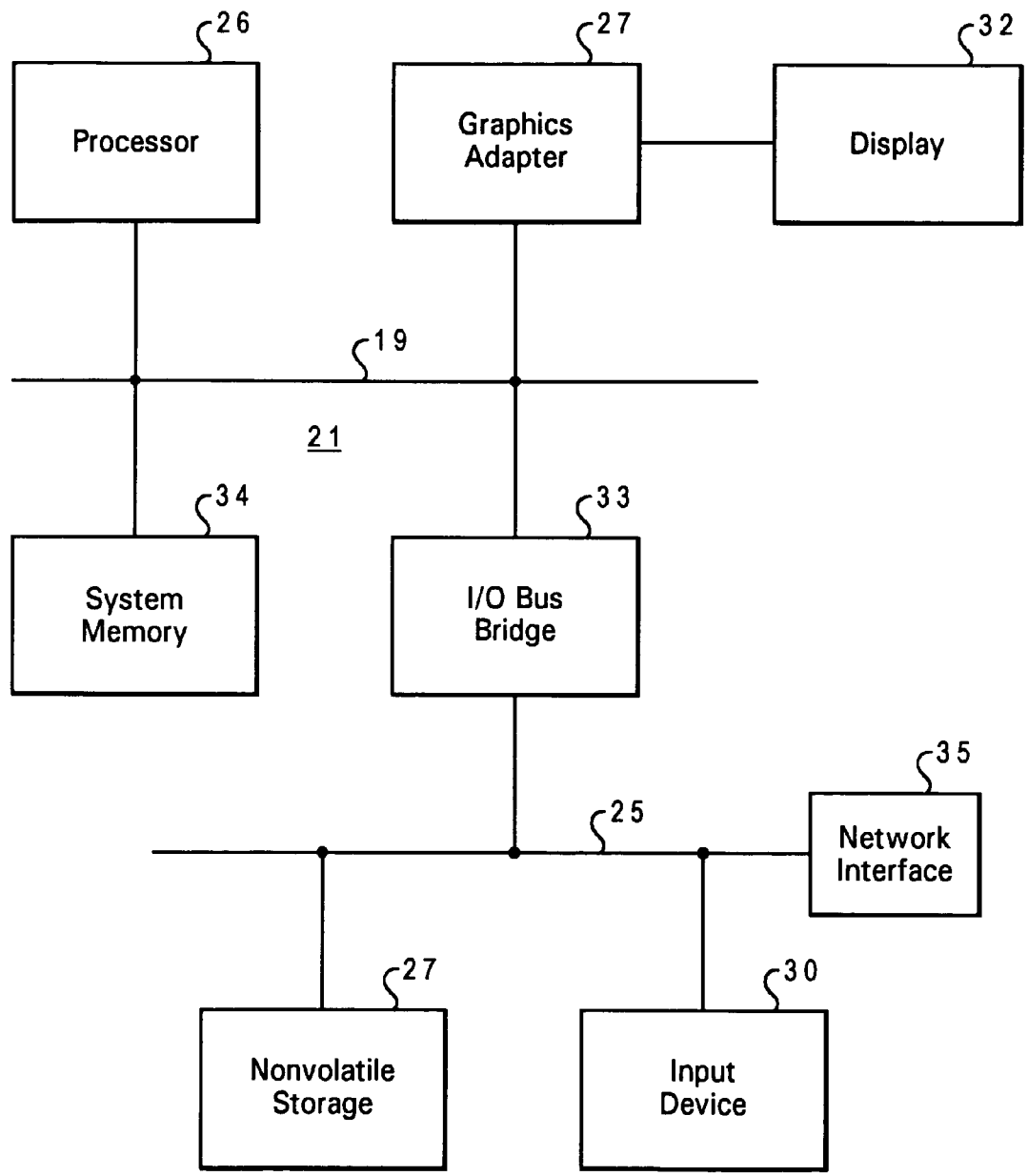
FIG. 3 is a block diagram of an exemplary client computer used to establish a secure connection between each of the multiple users of the client computer and the server.

With reference now to FIG. 3, there is depicted a block diagram of a data processing system in which a preferred embodiment of client computer 21 of the present invention may be implemented. Client computer 21 may be, for example, one of the models of personal computers available from International Business Machines Corporation of Armonk, N.Y. Client computer 21 includes a processor 26, which is connected to a system bus 19. In the exemplary embodiment, client computer 21 includes a graphics adapter 27 also connected to system bus 19, receiving user interface information for a display 32.

Also connected to system bus 19 are system memory 34 and input/output (I/O) bus bridge 33. I/O bus bridge 33 couples I/O bus 25 to system bus 19, relaying and/or transforming data transactions from one bus to the other. Peripheral devices such as nonvolatile storage 27, which may be a hard disk drive, and input device 30, which may include a conventional mouse, a trackball, or the like, is connected to I/O bus 25. Also connected to I/O bus 25 is a network interface 35, which provides an interface to secure connection 30 shown in FIG. 2.

The exemplary embodiment shown in FIG. 3 is provided solely for the purposes of explaining the invention and those skilled in the art will recognize that numerous variations are possible, both in form and function. For instance, client computer 21 might also include a compact disk read-only memory (CD-ROM) or digital video disk (DVD) drive, a sound card and audio speakers, and numerous other optional components. All such variations are believed to be within the spirit and scope of the present invention.

Figure 4:
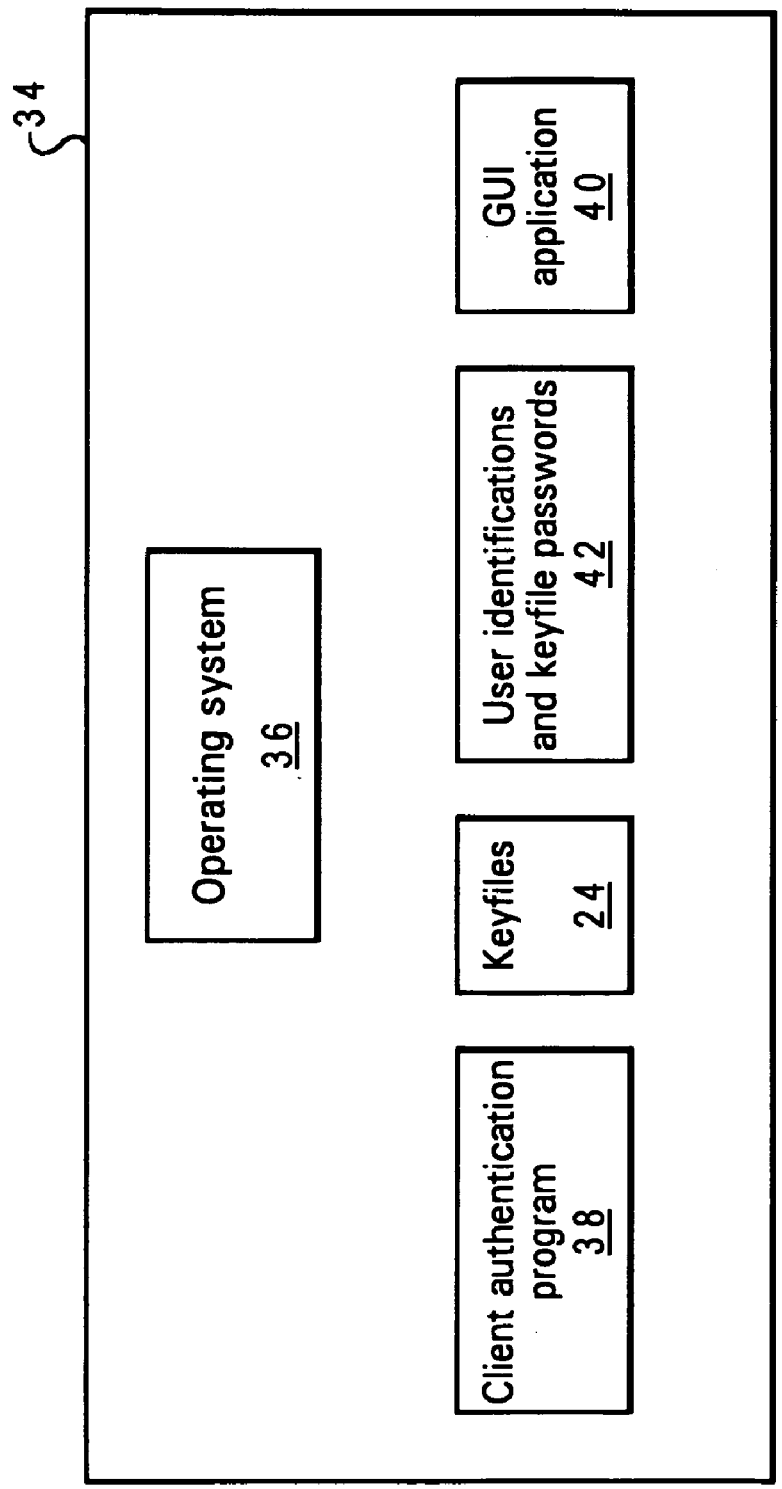
FIG. 4 is a block diagram of a portion of a memory content in the exemplary client computer used in the present invention.

Referring now to FIG. 4, there is depicted additional detail of system memory 34 showing its software contents. Stored within system memory 34 is an operating system 36, whose function includes controlling and deploying a client authentication program 38 as described below, as well as software for displaying a graphical user interface (GUI) 40 allowing a user to select which keyfile 24 is to be opened in response to keying in the appropriate password as described above. System memory 34 preferably also contains authentication data 42 that correlates a user's identification with that user's password to open that user's keyfile 24. The user's identification and password found in authentication data 42 are discussed in detail below as they relate to the present invention. Optionally, client authentication program 38, GUI 40, keyfiles 24 and authentication data 42 may also be stored in nonvolatile storage 26 (as shown in FIG. 3).

Figure 5:
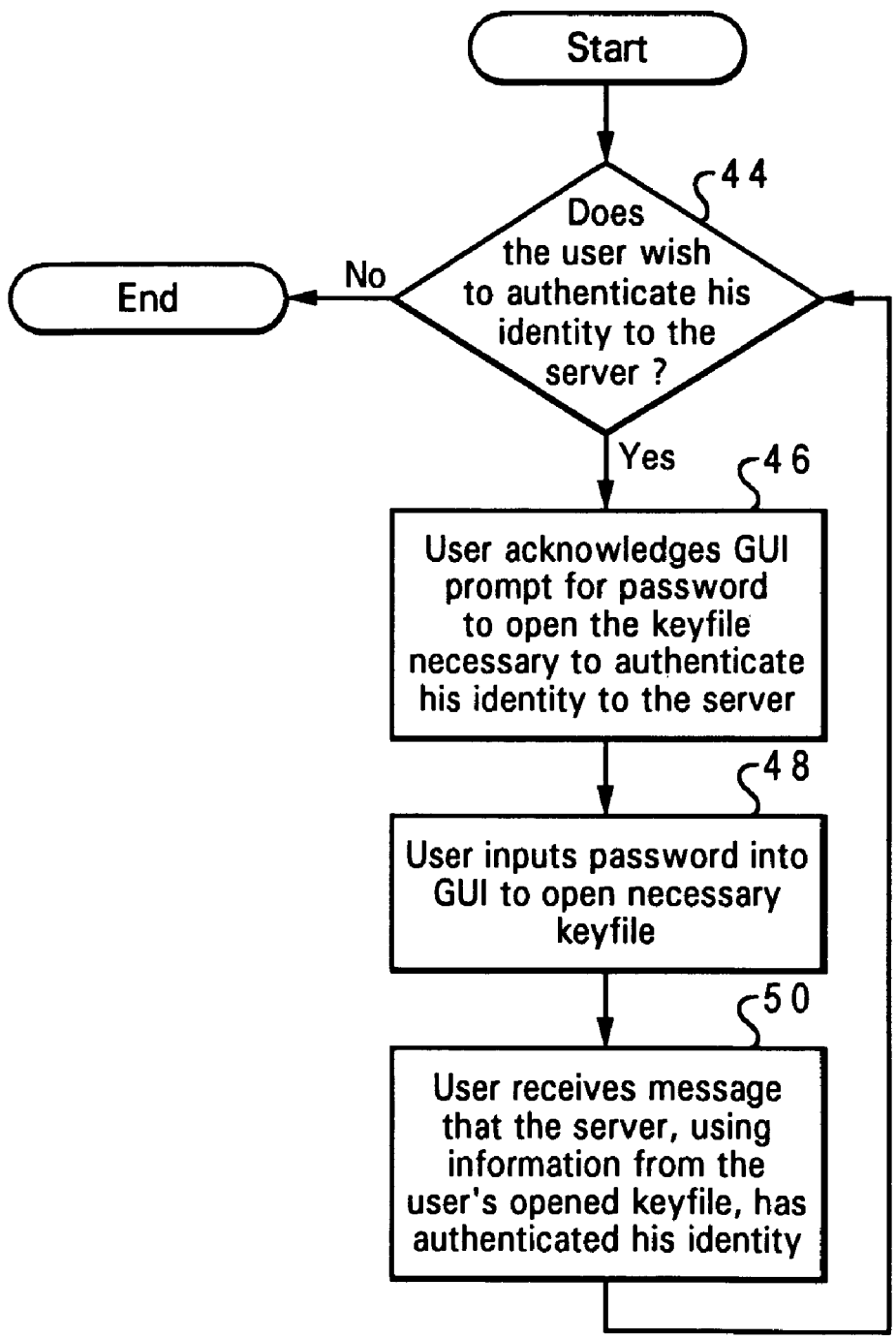
FIG. 5 is a flowchart depicting the process for the user of the client computer to provide access to a keyfile unique for that user.

With reference now to FIG. 5, there is a flowchart from the user's perspective of the operation of the present invention, including that as used with the exemplary system depicted in FIGS. 2–4. A query, as depicted in block 44, determines whether the user of client computer 21 wishes to authenticate that user's identity to server 23 upon server 23's request for such authentication. As described above, in an SSL environment, server 23 typically first establishes the server's authenticity to client computer 21. More specifically in the present invention, server 23 establishes server 23's authenticity and identity to a specific user from any of the multiple users that are authorized to use client computer 21. Each of the multiple users has a unique keyfile 24. If server 23 wishes to establish the identity of a specific user of client computer 21, thus prompting procedures for such user authentication, then that user must enter a unique user password 22 to open the user's keyfile 24, typically through a Graphical User Interface (GUI) as described in blocks 46 and 48. With the appropriate keyfile 24 now unlocked, the user is able to authenticate the user's identity with server computer 23. As described in block 50, the user will then receive a message from server 23 that the user's identity has been authenticated.

Figure 6:
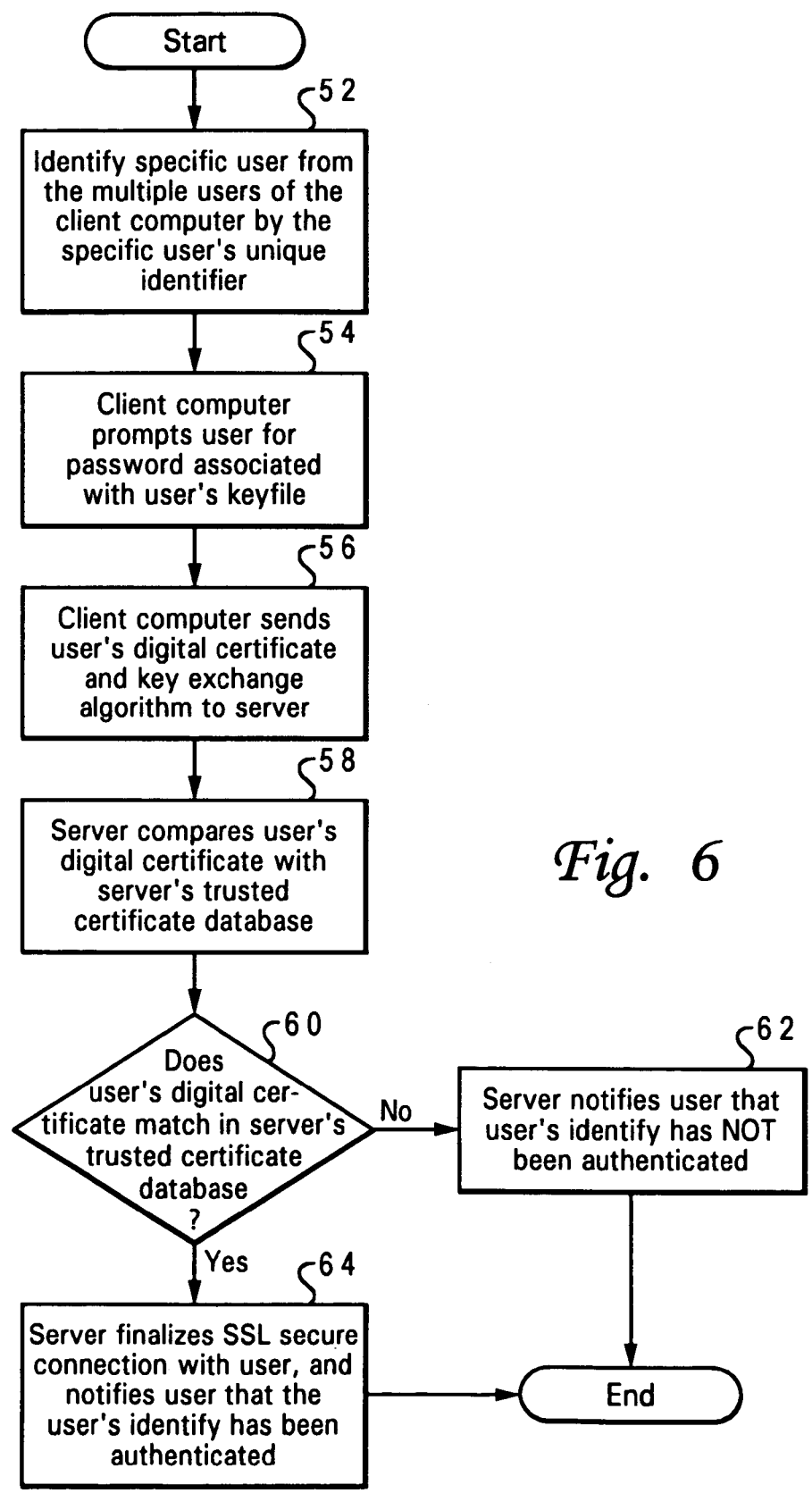
FIG. 6 is a flowchart illustrating the software process of authenticating the identity of the user, thus establishing the secure connection between the server and the client computer that is unique for the user.

This process seen by the user and described in FIG. 5 is further explained from the software perspective in FIG. 6, as contemplated using the exemplary system depicted in FIGS. 2–4. As described in block 52, client computer 21 first identifies which user of client computer 21 will be making a secure SSL connection with server 23. This query described in block 52 assumes that the user's identifier 15 has been previously stored in client computer 21. As depicted in block 54, client computer 21 then prompts the user, preferably through a Graphical User Interface (GUI) displayed on display 32 using GUI application 40, shown in FIGS. 3 and 4, respectively, for the user's password 22 that will unlock that user's keyfile 24 containing the user's digital certificate and private key found in authentication data 42 as described in FIG. 4. The user's digital certificate, which was issued by a Certificate Authority (CA) (not shown), contains the user's public cryptology key and a variety of identification information for that user. As shown in block 56, client computer 21 then sends the user's digital certificate and key exchange algorithm (preferred cipher suite) to server 23. Server 23 then compares the user's digital certificate with those stored in the server 23's trusted certificate database 15, as described in block 58. If the digital certificate matches one found in server 23's trusted certificate database 15, then server 23 has authenticated the identity of the user of client computer 21, and so notifies client computer 21 and its user, as described in blocks 60 and 64. If the user's digital certificate does not match up with one found in server 23's trusted certificate database 15, then server 23 is unable to authenticate the identity of the user of client computer 21, and so notifies client computer 21 and the user, and either terminates the secure connection 20 or prompts client computer 21 for remedial steps (not shown). If the user's digital certificate is trusted by server 23, then server 23 selects an appropriate cipher suite and tells client computer 21 which suite it wants to use. Client computer 21 then makes a final decision as to which cipher suite to use, and so notifies server 23. The user of client computer 21 and server 23 now have a secure SSL connection, and may now safely share and/or create a symmetric key.

Figure 7:
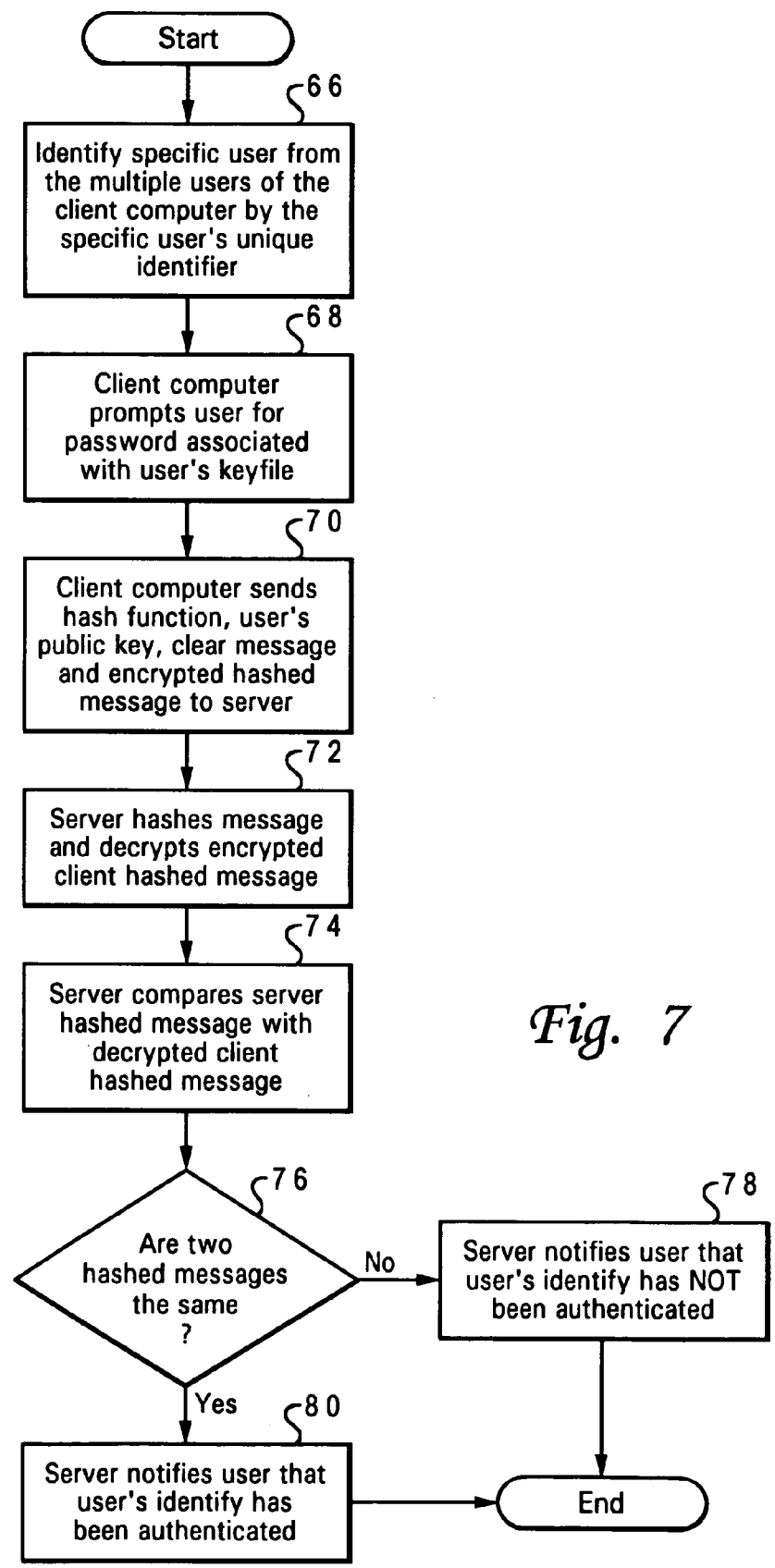
FIG. 7 is a flowchart illustrating the software process of authenticating the identity of the user using a digital signature through the use of a hashing procedure.

Alternatively, the user of client computer 21 may authenticate the user's identity with a digital signature. The digital signature is an electronic signature that hashes (encrypts into a fixed length summary code) a message (or simply the sender's name) into a hashed message (compressed summary of the un-hashed message) using a hash function (algorithm that performs the hashing operation). This process, as contemplated using the exemplary system depicted in FIGS. 2–4, is illustrated in FIG. 7. As described in block 66, client computer 21 first identifies which user of client computer 21 will be making a secure SSL connection with server 23. This query described in block 66 assumes that the user's identifier 15 has been previously stored by client computer 21. Client computer 21 then prompts the user, preferably through a Graphical User Interface (GUI), for the user's password 22 that will unlock that user's unique keyfile 24 containing the user's digital certificate and private key, as described in block 68. As described in block 70, the hash function, the user's public key, and the original message (such as the user's name) are transmitted in the clear from the sender (i.e., client computer 21) to the receiver (i.e., server 23), along with an encrypted version of the hashed message. The encryption of the hashed message is performed by client computer 21 using the user's private key stored in the user's keyfile 24. The receiver (i.e., server 23) then hashes the clear message with the received hash function and decrypts the hashed message using the user's public key, as described in block 72. Server 23 then compares the two hashed messages (the one that server 23 just hashed and the one server 23 just decrypted), as described in block 74. As shown in block 76, if the two hashed messages are the same, then server 23 can trust the sender to be the authorized user of client computer 21, since only that user is able to unlock that user's unique keyfile 24 whose private key and paired public key are used in the hashing operation just used. As shown in blocks 78 and 80, server 23 then notifies client computer 21 whether the identity of the specified user has been authenticated.

Figure 8:
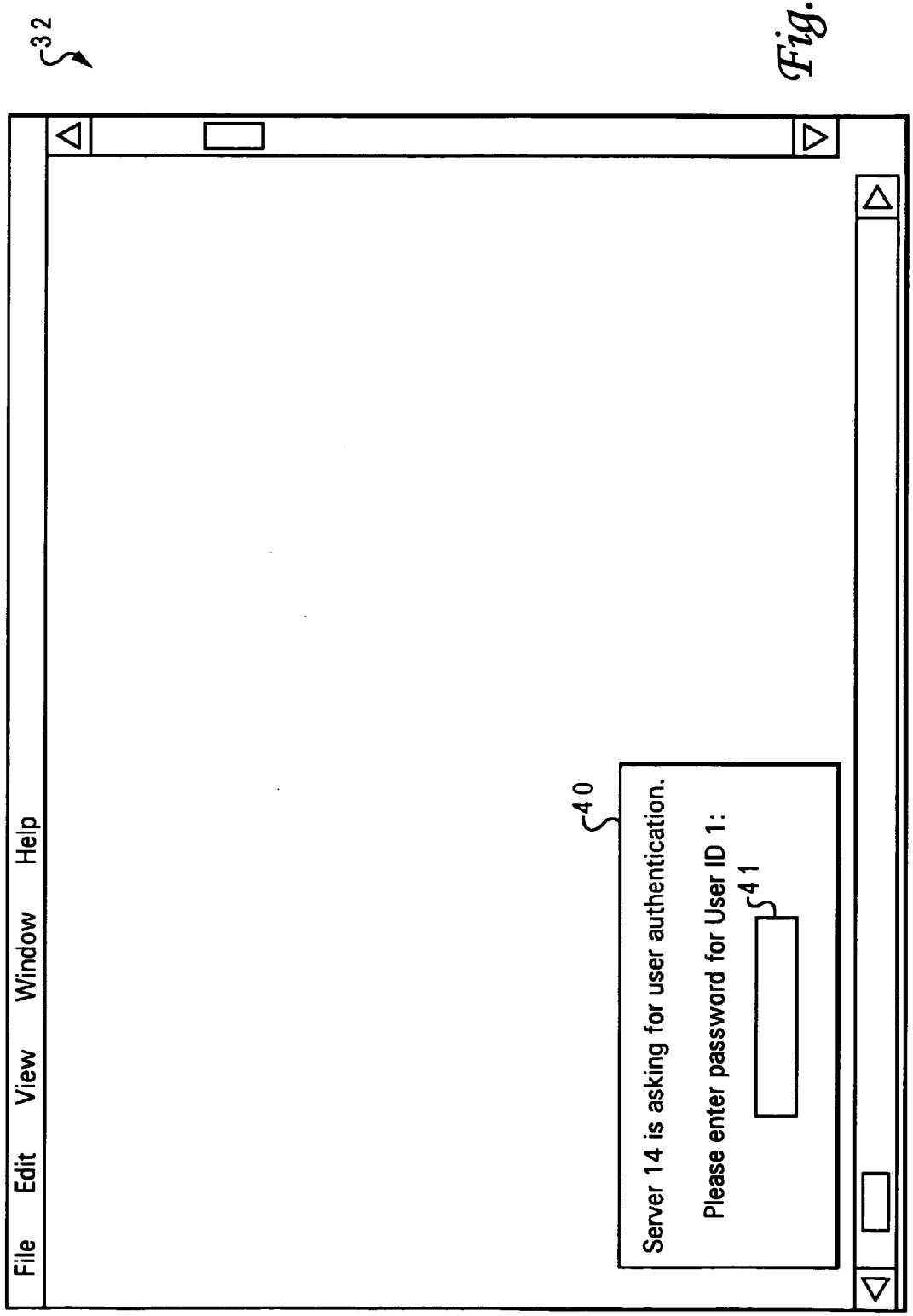
FIG. 8 depicts a Graphical User Interface (GUI) to allow each user of the client computer to select which keyfile(s) are to be accessible during a session.

Referring now to FIG. 8, there is depicted an exemplary Graphical User Interface (GUI) 40 used in an exemplary display 32 as described for client computer 21 in FIG. 3. GUI 40 prompts a specific end user identified as "User ID 1" for the user's unique password 22*a* to open that user's respective keyfile 24*a* (shown in FIG. 2). This prompt is described in FIG. 6 at block 54 and FIG. 7 in block 68. In a preferred embodiment, password 22 is entered in an active field 41 of GUI 40 that transmits password 22 to client authentication program 38 (shown in FIG. 4) to open keyfile 24 as described above.

Thus, the present invention allows each of multiple users to use the single client computer 21, and still be able to authenticate each user's identity with server 23 to establish an authenticated SSL secure connection. The users may be different individual persons, or may be different secured threads in a multi-threaded program. By isolating each thread, the total security of the application is thus improved.

It should further be appreciated that the method described above for establishing a secure connections to the server for the user of the client computer in a network utilizing an SSL system can be embodied in a computer program product in a variety of forms, and that the present invention applies equally regardless of the particular type of signal bearing media utilized to actually carry out the method described in the invention. Examples of signal bearing media include, without limitation, recordable type media such as floppy disks or compact disk read only memories (CD ROMS) and transmission type media such as analog or digital communication links.

While the invention has been particularly shown and described with reference to a preferred embodiment, it will be understood by those skilled in the art that various changes in form and detail may be made therein without departing from the spirit and scope of the invention.

What is claimed is:

1. A method for establishing a secure connection to a server for a specific user of a client computer on a network utilizing a Secure Sockets Layer (SSL) system, said method comprising:

storing a plurality of keyfiles for different users in a data storage that is accessible only to a client computer, via a local input, each of said keyfiles comprising a unique private cryptology key, a corresponding public cryptology key, and a name of a Certificate Authority (CA) that issued the unique private cryptolgy key and the corresponding public cryptology key for a specific user;

storing a plurality of passwords in said data storage, each of said passwords being associated with a respective keyfile, each of said passwords being capable of opening only one of said keyfiles;

in response to receiving one of said passwords input from the specific user, opening said one of said keyfiles associated with said one of said passwords and said specific user; and transmitting from said client computer to a server a digital certificate from said open keyfile to enable said server to authenticate an identity of said specific user from a plurality of users who are authorized to use said client computer, wherein a secure connection is established between the client computer and the server for the specific user.

2. The method of claim 1, further comprising:

storing an authentication data for said specific user in said data storage, said authentication data comprising a unique identifier that corresponds to a password for said specific user; and identifying said specific user for opening a keyfile according to said unique identifier.

3. The method of claim 1, further comprising:

authenticating an identity of said specific user through a process of hashing, said process including the steps of:

hashing a message into a hashed message using a hash function;

encrypting said hashed message into an encrypted hashed message using said private cryptology key; and transmitting said hash function, said message and said encrypted hashed message to said server.

4. The method of claim 1, further comprising prompting said specific user for a password through a Graphical User Interface (GUI) in a display associated with said client computer.

5. A client computer for establishing a secure connection to a server for a specific user of the client computer oFn a network utilizing a Secure Sockets Layer (SSL) system, said client computer comprising:

means for storing a plurality of keyfiles for different users in a data storage that is accessible only to a client computer, via a local input, each of said keyfiles comprising a unique private cryptology key, a corresponding public cryptology key, and a name of a Certificate Authority (CA) that issued the unique private cryptology key and the corresponding public cryptology key for a specific user;

means for storing a plurality of passwords in said data storage, each of said passwords being associated with a respective keyfile, each of said passwords being capable of opening only one of said keyfiles;

means for, in response to receiving one of said passwords input from the specific user, opening said one of said keyfiles associated with said one of said passwords and said specific user; and means for transmitting from said client computer to a server a digital certificate from said open keyfile to enable said server to authenticate an identity of said specific user from a plurality of users who are authorized to use said client computer, wherein a secure connection is established between the client computer and the server for the specific user.

6. The client computer of claim 5, further comprising:

means for storing an authentication data for said specific user in said data storage, said authentication data comprising a unique identifier that corresponds to a password for said specific user; and means for identifying said specific user for opening a keyfile according to said unique identifier.

7. The client computer of claim 5, further comprising:

means for authenticating the identity of said specific user through a process of hashing, said means for authenticating the identity of said specific user through said process of hashing including:

means for hashing a message into a hashed message using a hash function;

means for encrypting said hashed message into an encrypted hashed message using said private cryptology key; and means for transmitting said hash function, said message and said encrypted hashed message to said server.

8. The client computer of claim 5, further comprising means for prompting said specific user for a password through a Graphical User interface (GUI) in a display associated with said client computer.

9. A computer program product residing on a computer usable medium for establishing a secure connection to a server for a specific user of a client computer on a network utilizing a Secure Sockets Layer (SSL) system, said computer program product comprising:

program code means for storing a plurality of keyfiles for different users in a data storage that is accessible only to a client computer, via a local input, each of said keyfiles comprising a unique private cryptology key, a corresponding public cryptology key, and a name of a Certificate Authority (CA) that issued the unique private cryptology key, and a corresponding public cryptology key for a specific user;

program code means for storing a plurality of passwords in said data storage, each of said passwords being associated with a respective keyflie, each of said passwords being capable of opening only one of said keyflies;

program code means for, in response to receiving one of said passwords input from the specific user, opening said one of said keyfiles associated with said one of said passwords and said specific user; and program code means for transmitting from said client computer to a server a digital certificate from said open keyfile to enable said server to authenticate an identity of said specific user from a plurality of users who are authorized to use said client computer, wherein a secure connection is established between the client computer and the server for the specific user.

10. The computer program product of claim 9, further comprising:

program code means for storing an authentication data for said specific user in said data storage, said authentication data comprising a unique identifier that corresponds to a password for said specific user; and program code means for identifying said specific user for opening a keyfile according to said unique identifier.

11. The computer program product of claim 9, further comprising:

program code means for authenticating the identity of the specific user through a process of hashing, said program code means including:

program code means for hashing a message into a bashed message using a hash function;

program code means for encrypting said hashed message into an encrypted hashed message using said private cryptology key; and program code means for transmitting said hash function, said message and said encrypted hashed message to said server.

12. The computer program product of claim 9, further comprising:

program code means for displaying a Graphical User Interface (GUI) in a display associated with said client computer; and program code means for prompting said specific user for a password through said GUI.

* * * * *